United States Patent
Smith et al.

(10) Patent No.: US 9,953,467 B2
(45) Date of Patent: Apr. 24, 2018

(54) SECURE VEHICULAR DATA MANAGEMENT WITH ENHANCED PRIVACY

(71) Applicant: INTEL CORPORATION, Santa Clara, CA (US)

(72) Inventors: Ned M. Smith, Hillsboro, OR (US); Thomas G. Willis, Portland, OR (US); Nathan Heldt-Sheller, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 678 days.

(21) Appl. No.: 14/361,516

(22) PCT Filed: Dec. 19, 2013

(86) PCT No.: PCT/US2013/076573
§ 371 (c)(1),
(2) Date: May 29, 2014

(87) PCT Pub. No.: WO2015/094287
PCT Pub. Date: Jun. 25, 2015

(65) Prior Publication Data
US 2015/0178999 A1  Jun. 25, 2015

(51) Int. Cl.
*G01M 19/00* (2006.01)
*G07C 5/00* (2006.01)
(Continued)

(52) U.S. Cl.
CPC ............ *G07C 5/008* (2013.01); *G07C 5/085* (2013.01); *H04W 4/003* (2013.01); *H04W 4/046* (2013.01); *H04W 12/02* (2013.01)

(58) Field of Classification Search
CPC ................................ G07C 5/008; G07C 5/085
See application file for complete search history.

(56) References Cited

U.S. PATENT DOCUMENTS 9,014,888 B2 * 4/2015 Sukkarie ............... G01C 21/26
701/22
9,165,824 B2 10/2015 Chandhok et al.
(Continued)

FOREIGN PATENT DOCUMENTS

| CN | 102314449 A | 1/2012 |
| WO | 2010-133440 A1 | 11/2010 |
| WO | 2013-123057 A1 | 8/2013 |

OTHER PUBLICATIONS

International Search Report and Written Opinion from related application PCT/US2013/076573 dated Sep. 24, 2014.
(Continued)

*Primary Examiner* — Adam M Alharbi
(74) *Attorney, Agent, or Firm* — Grossman Tucker Perreault & Pfleger, PLLC

(57) ABSTRACT

The present disclosure is directed to secure vehicular data management with enhanced privacy. A vehicle may comprise at least a vehicular control architecture (VCA) for controlling operation of the vehicle and a device. The VCA may record operational data identifying at least one vehicle operator and vehicular operational data recorded during operation of the vehicle by the at least one vehicle operator. The device may include at least a communication module and a trusted execution environment (TEE) including a privacy enforcement module (PEM). The PEM may receive the operational data from the VCA via the communication module, may generate filtered data by filtering the operational data based on privacy settings and may cause the filtered data to be transmitted via the communication module. The filtered data may be transmitted to at least one data consumer. The privacy settings may be configured in the PEM by the at least one operator.

18 Claims, 4 Drawing Sheets

(51) Int. Cl.
*H04W 4/04* (2009.01)
*H04W 12/02* (2009.01)
*G07C 5/08* (2006.01)
*H04W 4/00* (2018.01)

(56) References Cited

U.S. PATENT DOCUMENTS

| | | |
|---|---|---|
| 9,385,085 B2 | 7/2016 | Chandhok et al. |
| 2002/0111725 A1 | 8/2002 | Burge |
| 2005/0165639 A1* | 7/2005 | Ross ............... G06Q 30/0267 |
| | | 705/14.64 |
| 2007/0263632 A1 | 11/2007 | Sobue et al. |
| 2008/0148374 A1 | 6/2008 | Spaur et al. |
| 2009/0326735 A1 | 12/2009 | Wood et al. |
| 2009/0326791 A1 | 12/2009 | Horvitz et al. |
| 2011/0313663 A1 | 12/2011 | Kellum et al. |
| 2013/0099911 A1 | 4/2013 | Mudalige et al. |
| 2013/0212659 A1 | 8/2013 | Maher et al. |
| 2016/0249853 A1* | 9/2016 | Ricci ............... A61B 5/4809 |

OTHER PUBLICATIONS

International Preliminary Report on Patentability from related application PCT/US2013/016573 dated Jun. 21, 2016.
International Preliminary Report on Patentability and Written Opinion, issued in corresponding PCT Application No. PCT/US2013/076573, dated Jun. 30, 2016.
Korean Office Action issued in Korean Application No. 2016-7019167, dated Jun. 21, 2017, with English translation, 10 pages.
Korean Office Action issued in Korean Application No. 2016-7019167, dated Nov. 28, 2017, with English translation, 6 pages.
Extended European Search Report issued in European Application No. 138995683, dated Jul. 20, 2017, 7 pages.
Chinese Office Action issued in Chinese Application No. 201380081044.5, dated Jan. 25, 2018, with English machine translation, 15 pages.

\* cited by examiner

SECURE VEHICULAR DATA MANAGEMENT WITH ENHANCED PRIVACY

TECHNICAL FIELD

The present disclosure relates to data security, and more particularly, to a scheme for securely protecting the privacy of operator data available via a vehicular control architecture.

BACKGROUND

The rapid evolution of communication technology is causing wireless communication to infiltrate into all aspects of society. Further to emerging advanced communication devices such as smart phones, some existing applications that did not commonly feature the ability to interact via electronic communication are now gaining this functionality. For example, many vehicles possess the ability to interact with operators, riders, other vehicles, vehicle support systems, etc. via wired or wireless communication. Most commonly, operators and/or riders may access smart vehicle systems for consuming multimedia content, accessing navigation or other directional systems, accessing networks such as a local area-network (LAN) or a wide-area network (WAN) like the Internet, etc. However, these user-level interactions are merely the beginning of how electronic communications are being integrated into vehicular systems.

The technology that controls the operation of automobiles is moving from traditional mechanical-based systems to electronic control. These electronic controls systems not only control the operation of modern cars, but may also be able to store data related to operation. For example, automobile speed, force reaction due to cornering, operator system access (e.g., turn signal use, entertainment system use, cellular communication system use, etc.) may all be tracked and recorded by the car's control system. Currently this information may be used principally for vehicle maintenance. However, soon it may be possible to identify the vehicle operator and/or passengers at the time vehicular operational data is recorded. This capability may desirable to various entities including, for example, insurance companies, governmental bodies (e.g., law enforcement, rule-making bodies, etc.), organizations that publish vehicle-related statistics, etc. While societal benefits may exist for making vehicular data available, a scenario wherein operator/vehicle data is freely disseminated to parties (known or unknown to a vehicle operator) introduces substantial privacy concerns that may impact its acceptance.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
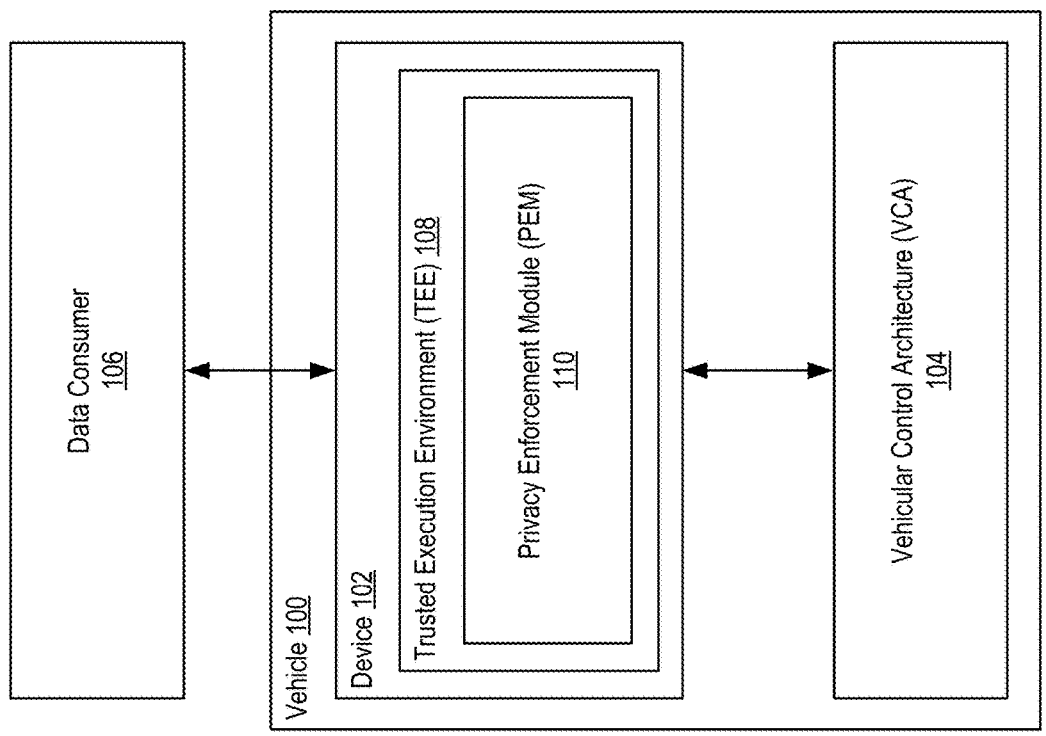
FIG. 1 illustrates an example device configured for secure vehicular data management with enhanced privacy in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

The present disclosure is directed to secure vehicular data management with enhanced privacy. In one embodiment, a vehicle may comprise at least a vehicular control architecture (VCA) for controlling operation of the vehicle and a device. In addition to vehicular control, the VCA may record operational data identifying at least one vehicle operator and vehicular operational data recorded during operation of the vehicle by the at least one vehicle operator. The device may include at least communication module and a privacy enforcement module (PEM) secured in a trusted execution environment (TEE). In one embodiment, the PEM may receive the operational data from the VCA via the communication module, may generate filtered data by filtering the operational data based on privacy settings and may then cause the filtered data to be transmitted via the communication module. For example, the filtered data may be transmitted to at least one data consumer coupled to the VCA, located outside of the vehicle, etc. The privacy settings may be configured in the PEM by the at least one operator.

In one embodiment, a device may comprise, for example, a communication module and a trusted execution environment including at least a privacy enforcement module. The communication module may be to communicate with at least a vehicular control architecture. The vehicular control architecture may be for controlling operation of a vehicle in which the device is situated. The privacy enforcement module may be to receive operational data from the vehicular control architecture via the communication module and to generate filtered data by filtering the operational data based on privacy settings. The privacy enforcement module may further be to cause the filtered data to be transmitted by the communication module.

In one embodiment, the communication module may further be to communicate with at least one data consumer that may be, for example, situated outside of the vehicle. The privacy enforcement module may further be to receive a request for the filtered data from the at least one data consumer via the communication module. The trusted execution environment may be a secure workspace in which only known-good programs execute, the privacy enforcement module being a known-good program. The privacy enforcement module being to generate filtered data may comprise the privacy enforcement module being to remove at least a portion of the operational data from the filtered data based on the privacy settings. The operational data may comprise data identifying at least one vehicle operator and vehicular operational data recorded during operation of the vehicle by the at least one vehicle operator. The privacy enforcement module being to generate filtered data may comprise the privacy enforcement module being to replace the data identifying the at least one vehicle operator with coded identification data or to alter the data identifying the at least one vehicle operator to render the at least one vehicle operator anonymous based on the privacy settings.

In the same or another embodiment, the vehicular control architecture may comprise a plurality of controllers for controlling different areas of vehicular operation. The plurality of controllers may communicate using at least one of a bus communication architecture or an optical mesh communication architecture. At least one controller in the plurality of controllers may be to control a user interface in the vehicle for allowing the privacy settings to be configured. An example method consistent with embodiments of the present disclosure may comprise receiving operational data in a device from a vehicular control architecture for controlling a vehicle in which the device is situated, generating filtered data by filtering the operational data based on privacy settings, the filtered data being generated by a privacy enforcement module included in a trusted execution environment in the device and causing the filtered data to be transmitted.

FIG. 1 illustrates an example device configured for secure vehicular data management with enhanced privacy in accordance with at least one embodiment of the present disclosure. For the sake of explanation herein, vehicle 100 may be described as road-going transportation (e.g., motorcycle, car, truck, bus etc.). However, vehicle 100 may be another type of vehicle such as, but not limited to, a rail-going vehicle, aquatic vehicle, aircraft, tracked vehicle, etc. Vehicle 100 may include, for example, device 102 and vehicular control architecture (VCA) 104. Generally speaking, device 102 may filter operational data received from VCA 104 to avoid providing information that may be deemed private to data consumer 106. Device 102 may be original equipment installed in vehicle 100 during manufacture, may be installed as aftermarket equipment, may be removable and applicable to other uses, etc. For example, a removable device 102 may only operate in a manner consistent with functionality such as described herein when combined with vehicle 100. Examples of removable devices 102 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc.

VCA 104 may comprise at least one controller to control operations in vehicle 100. In practice, vehicles like automobiles may comprise a plurality of controllers for controlling different aspects of vehicular operation. For example, individual controllers may be used to control engine operation, drivetrain shifting, suspension adjustment, heating, ventilating and air conditioning (HVAC) operation, driver interface operation, entertainment and navigation systems, security, vehicle condition monitoring and warning systems, etc. These controllers may also store information regarding vehicular operation. For example, controllers may store vehicle location, speed, acceleration, suspension changes (e.g., when the vehicle is cornering, G-force and/or body angle during cornering, etc.), user actions (e.g., turn signal operation, radio operation, communication system operation, etc.), etc. In more advanced vehicles, the operator of the vehicle may also be determined by a controller in VCA 104. For example, an operator may be identified by electronics in the key used to start vehicle 100, by codes keyed into a user interface to deactivate security in vehicle 100, by biometric identification (e.g., by voice identification, fingerprint identification, facial recognition, etc.). Thus, VCA 104 may be able to store the identification of the vehicle operator along with vehicular operational data recorded when the identified vehicle operator is operating vehicle 100.

Data consumer 106 may include at least one entity to receive filtered data from device 102. Examples of data consumers 106 may include a mechanic (e.g., via a device physically connected to vehicle 100), remotely situated entities that collect vehicular operational data, etc. In the instance wherein data consumer 106 is a remote entity, device 102 may interact with equipment associated with the remote entity via wireless communication. For example, the equipment of the remote entity may include at least one computing device (e.g., a server) accessible via a WAN like the Internet (e.g., in a cloud-based computing architecture).

Device 102 may comprise trusted execution environment (TEE) 108 including, for example, privacy enforcement module (PEM) 110. TEE 108 may be a secure workspace in which known-good programs (e.g., PEM 110) may execute, confidential information may be stored in a secure manner, etc. In one example implementation, TEE 108 may employ Secure Enclave (SE) technology developed by the Intel Corporation. SE may provide a safe and hardware-encrypted computation and storage area inside of system memory, the contents of which cannot be deciphered by privileged code or even through the application of hardware probes to memory bus. When TEE 108 resides within an SE, embodiments consistent with the present disclosure make it impossible for an intruder to decipher the contents of TEE 108.

For example, SE may be visualized as a virtual safe for protecting applications, data, etc. An application developer may specify the memory region that must be protected, which creates the safe. At this point there is a safe available, but nothing of value is stored inside. The application developer may then place code into the protected memory region and may initialize any necessary data. At this point the code and data have been placed inside of the safe, but nothing is secret yet as anyone may have observed what was placed into the safe because "the safe door" is still open. The application may then initialize the SE, which may be considered as the equivalent of closing and locking the door of the safe. From this point forward the enclave code may execute only inside of the safe and running code inside this enclave may generate secure keys (e.g., protected data). Protected data values cannot be observed outside of the SE, and thus, the code and data is inaccessible outside of the SE.

In an example implementation wherein TEE 108 resides within an SE, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE 108. For example, known-good programs in TEE 108 may encrypt data such as keys, passwords, licenses, etc. so that only verified good programs may decrypt this information. While only one TEE 108 is disclosed in device 102, it is also possible for a plurality of TEEs 108 to exist. The use of a plurality of TEEs 108 may increase security in device 102 in that if one TEE 108 is compromised the security of the remaining separate TEEs 108 remains intact.

In general, PEM 110 may be to filter operational data received from VCA 104 based on privacy settings prior to transmission of the operational data (e.g., to data consumer 106). For example, vehicle 100 may record very comprehensive operational data about an operator of vehicle 100 and the general operation of vehicle 100 while driven by the operator. This operational data may include, for example, the identity of the operator, locations where the operator drove vehicle 100, how vehicle 100 was driven, what occurred while vehicle 100 was driven, etc. The operator of vehicle 100 may not want to make all of this operational data available to data consumer 106 due to privacy concerns, safety/security concerns, etc.

PEM 110 may be a known-good program within TEE 108, and thus, TEE 108 may protect PEM 110 from being accessed, changed, corrupted, etc. For example, people with technical skill may attempt to access PEM 110 to alter the privacy settings to allow personal information to be provided to data consumer 106. The privacy settings may be configured during the manufacture of the vehicle, by an operator of the vehicle via a user interface in vehicle 100, etc. The privacy settings may instruct PEM 110 to generate filtered data by removing and/or changing portions of the operational data received from VCA 104. For example, PEM 110 may replace occurrences of the operator's actual identity (e.g., name, address, phone, etc.) with encoded information. Examples of encoded information may include insurance account numbers, service subscriber numbers, vehicle identification numbers (VIN), etc. Alternatively, PEM 110 may simply remove personal information as indicated by the privacy settings. For example, PEM 110 may remove one or more of location data, speed data, data about the actions performed by the operator in vehicle 100, etc.

Figure 2:
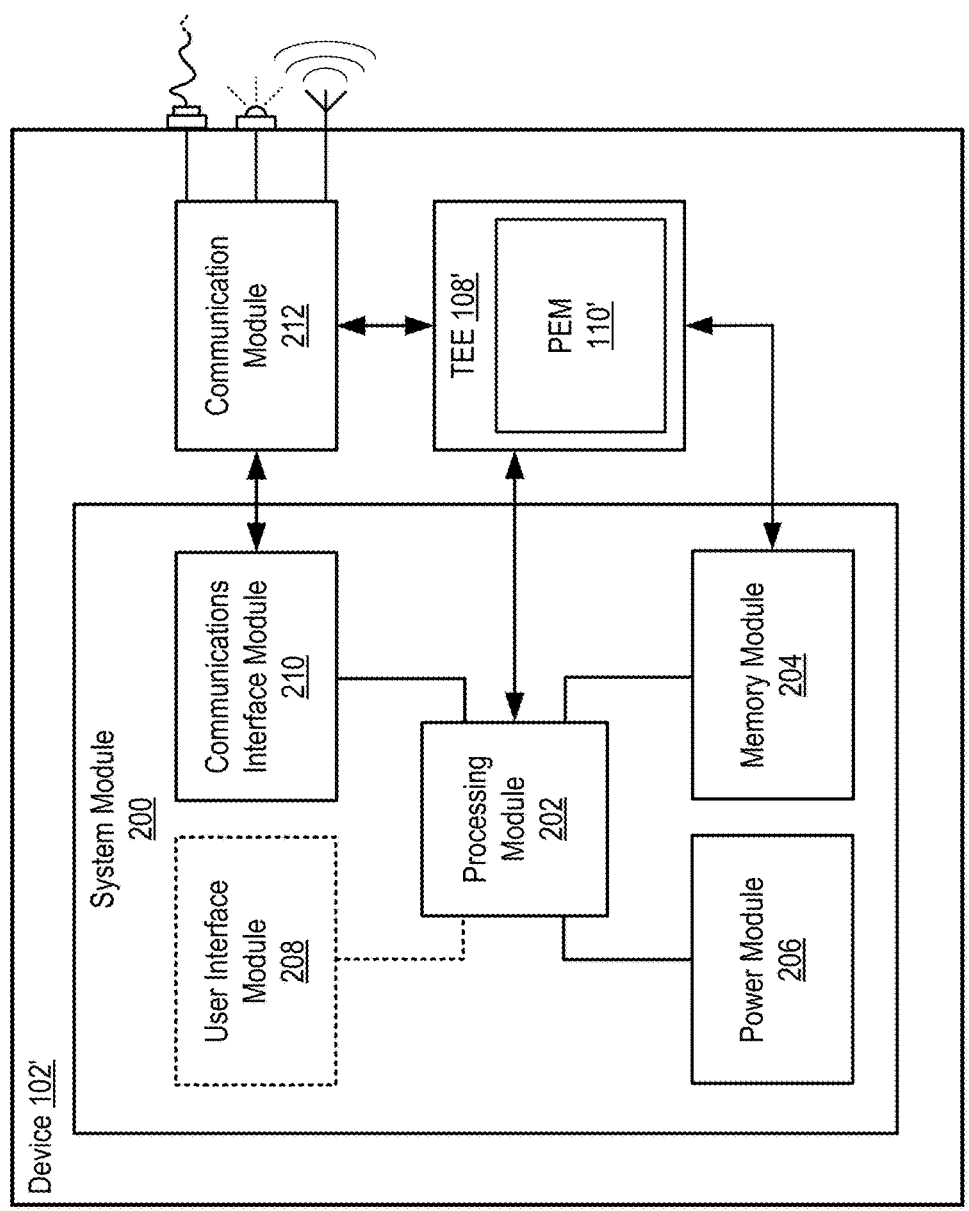
FIG. 2 illustrates an example configuration for a device in accordance with at least one embodiment of the present disclosure.

FIG. 2 illustrates an example configuration for a device in accordance with at least one embodiment of the present disclosure. In particular, device 102' may be able to perform example functionality such as disclosed in FIG. 1. However, device 102' is meant only as an example of equipment usable in embodiments consistent with the present disclosure, and is not meant to limit these various embodiments to any particular manner of implementation.

Device 102' may comprise system module 200 configured to manage device operations. System module 200 may include, for example, processing module 202, memory module 204, power module 206, user interface module 208 and communication interface module 210. Device 102' may also include communication module 212 and TEE 108'. While communication module 212 and TEE 108' have been shown separately from system module 200, the example implementation of device 102' has been provided merely for the sake of explanation herein. Some or all of the functionality associated with communication module 212 and/or TEE 108' may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 102' such as, for example, static RAM (SRAM) or Dynamic RAM (DRAM). ROM may include memories such as Bios or Unified Extensible Firmware Interface (UEFI) memory configured to provide instructions when device 102' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, fuel cell, etc.), and related circuitry configured to supply device 102' with the power needed to operate.

User interface module 208 may be optional based on, for example, the type of device 102'. For example, user interface module 208 may not be necessary if device 102' is factory installed equipment in vehicle 100, while a removable device 102' (e.g., a smart phone) may include user interface module 208. User interface module 208 may include equipment and/or software to allow users to interact with device 102' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within device 102' and/or may be coupled to device 102' via a wired or wireless communication medium.

Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In the embodiment illustrated in FIG. 2, TEE 108' may be configured to interact with at least user processing module 202, memory module 204 and communication module 212. In an example of operation, PEM 110' operating within TEE 108' may receive a request for operational data via communication module 212 (e.g., from data consumer 106) and may then receive operational data from VCA 104 via communication module 212. TEE 108' may rely upon processing module 202 and/or memory module 206 for generating filtered data from the operational data. After the data filtering is complete, PEM 110' may cause communication module 212 to transmit the filtered data from device 102' (e.g., to data consumer 106).

Figure 3:
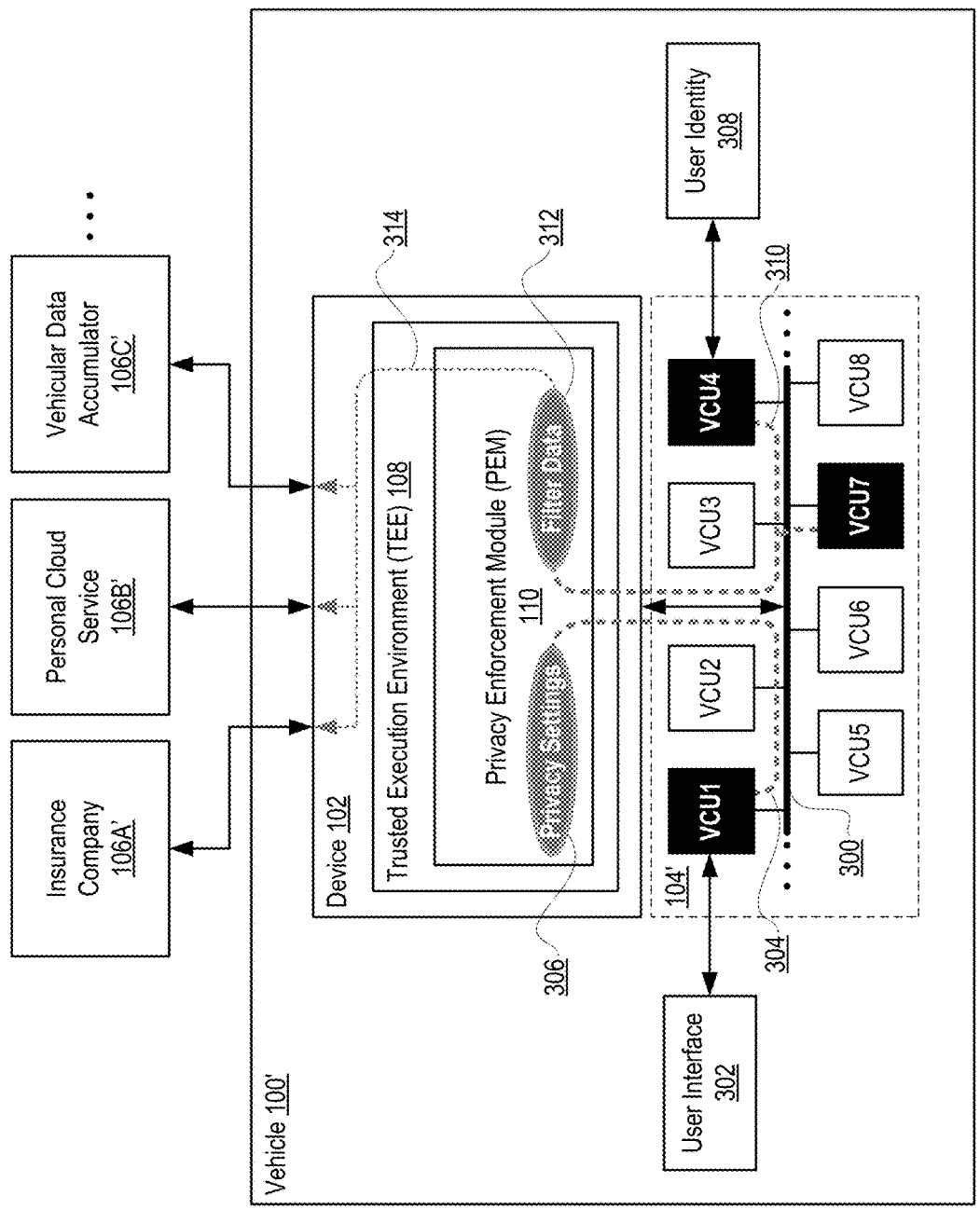
FIG. 3 illustrates example implementation and operation of secure vehicular data management with enhanced privacy in accordance with at least one embodiment of the present disclosure.

FIG. 3 illustrates example implementation and operation of secure vehicular data management with enhanced privacy in accordance with at least one embodiment of the present disclosure. In FIG. 3, VCA 104' has been illustrated as a plurality of vehicular control units (VCUs) comprising VCU1, VCU2, VCU3, VCU4, VCU5, VCU6, VCU and VCU 8 (e.g., collectively, VCU1 . . . 8) that may interact on bus structure 300. While eight VCU1 . . . 8 have been illustrated in FIG. 3, more or less VCUs may be employed depending on the complexity of vehicle 100' (e.g., the number of automated systems in vehicle 100'), etc. VCU1 . . . 8 may each control a different area of operation in vehicle 100'. Bus structure 300 may be a control area network bus (CAN bus), an automotive optical control mesh, or any other type of network that enables communication between VCU1 . . . 8 in vehicle 100', as well as with PEM 110. For example, communication module 212 as described with respect to device 102' may comprise an interface so that PEM 110 may communicate on bus 300, or alternatively, device 102 may comprise a separate interface for communicating on bus 300.

User interface 302 may be a user interface accessible to operators of vehicle 100'. An example of user interface 302 may include a navigation/communication/entertainment system in vehicle 100'. User interface 302 may be supported by VCU1. Operators of vehicle 100' may interact with user interface 302 to configure desired privacy settings 306 in PEM 110. For example, the interaction with user interface 302 may configure the privacy settings in VCU1, which may transmit the privacy settings to PEM 110 via bus 300 as shown at 304. While not shown, it is also possible for user interface 302 to interact directly with PEM 110. For example, when device 102 is removable (e.g. a smart phone, mobile computing device, etc.), an operator may interact directly with removable device 102 via user interface module 208 to configure privacy settings 306.

In an example of operation, an operator may be identified by a VCU (e.g., VCU4) upon entering vehicle 100', deactivating vehicular security, starting vehicle 100', etc. as shown at 308. Various VCUs may store operational data and then provide the operational data to PEM 110 via bus 300 as shown at 310. The operational data may be provided, for example, periodically, upon request, upon the occurrence of events (e.g., service alerts), etc. PEM 110 may then employ privacy settings 306 to generate filtered data by filtering the operational data. Filtering may include changing or removing some of the operational data based on the privacy settings. The filtered data may then be transmitted to data consumers 106A', 106B' and 106C' (collectively 106A . . . C') as shown at 314. Example data consumers may include, but are not limited to, insurance company 106A', personal cloud service 106B' (e.g., remotely located data storage accessible via a WAN like the Internet), vehicular data accumulator 106C' (e.g., a private or governmental agency charged with determining driving laws), etc. While three data consumers 106A . . . C' have been disclosed in FIG. 3, more or less data consumers 106 may exist depending on the parties interested in operational data.

Figure 4:
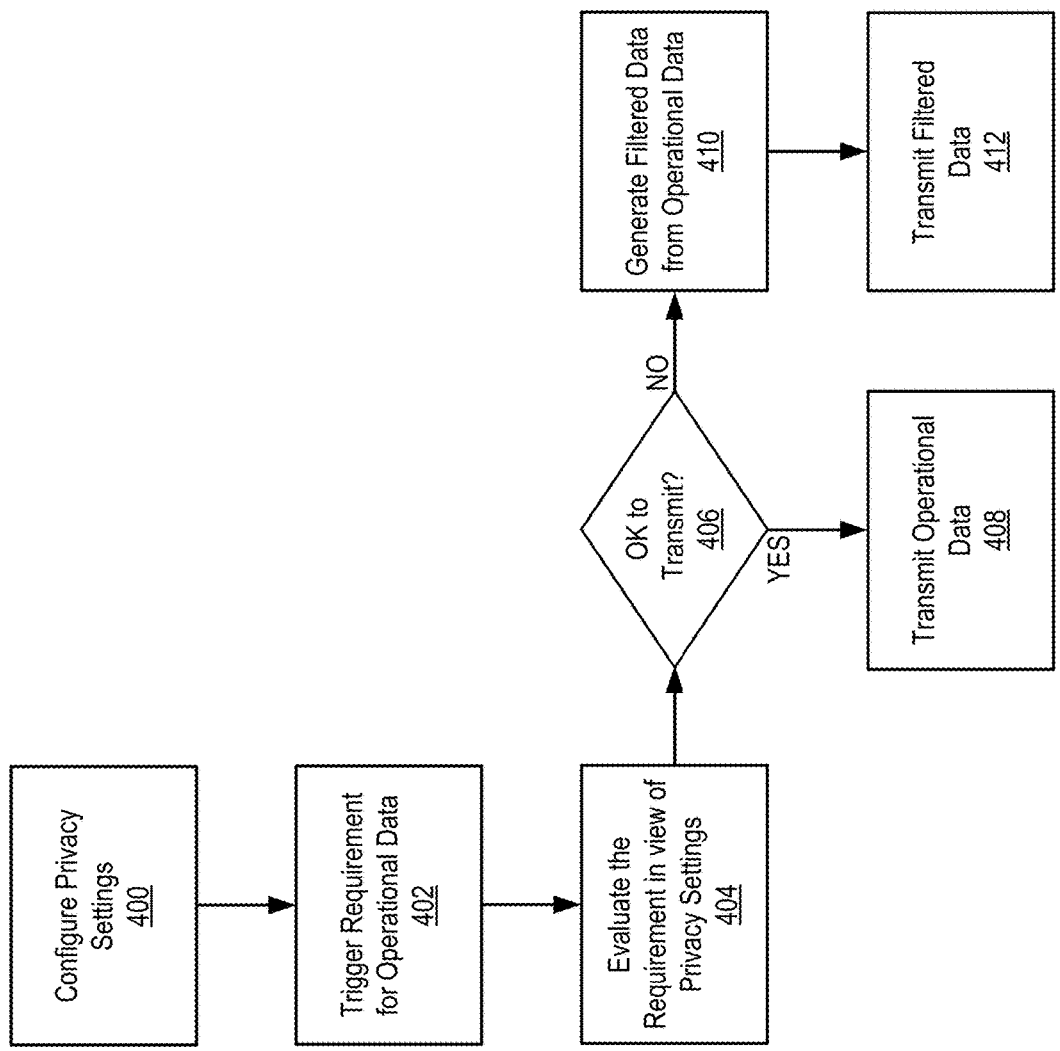
FIG. 4 illustrates example operations for secure vehicular data management with enhanced privacy in accordance with at least one embodiment of the present disclosure.

FIG. 4 illustrates example operations secure vehicular data management with enhanced privacy in accordance with at least one embodiment of the present disclosure. In operation 400 privacy settings may be configured in a device within a vehicle. For example, an operator may configure the privacy settings via a user interface provided by a navigation, entertainment and/or communication interface in the vehicle. A requirement for operational data may then be triggered in operation 402. For example, a request may be received from a data consumer (e.g., a pull configuration), a periodic or event-based requirement to transmit operational data may be triggered (e.g., a push configuration), etc. In operation 404 the data to be transmitted per the requirement may be evaluated in view of the privacy settings. More specifically, the composition of the operational data to be transmitted may be reviewed based on the previously configured privacy settings to determine if data filtering is required.

A determination may be made in operation 406 as to whether it is OK to transmit the operational data (e.g., based on the privacy settings). If in operation 406 it is determined that the operational data is OK to transmit, then in operation 408 the operational data may be sent to, for example, at least one data consumer. Alternatively, if in operation 406 it is determined that the operational data is not in condition OK to transmit (e.g., that at least a portion of the operational data includes information barred from transmission by the privacy settings), then in operation 408 filtered data may be generated based on filtering the operational data. For example, at least a portion of the operational data may be altered or removed (e.g., by a PEM operating in the device) based on the privacy settings. The filtered data may be transmitted in operation 412 (e.g., to at least one data consumer). In one embodiment, new requirements for operational data may cause operations to return to operation 402, while a new operator using the vehicle may cause operations to resume at 400 for new privacy settings to be configured.

While FIG. 4 illustrates operations according to an embodiment, it is to be understood that not all of the operations depicted in FIG. 4 are necessary for other embodiments. Indeed, it is fully contemplated herein that in other embodiments of the present disclosure, the operations depicted in FIG. 4, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to secure vehicular data management with enhanced privacy. A vehicle may comprise at least a vehicular control architecture (VCA) for controlling operation of the vehicle and a device. The VCA may record operational data identifying at least one vehicle operator and vehicular operational data recorded during operation of the vehicle by the at least one vehicle operator. The device may include at least a communication module and a trusted execution environment (TEE) including a privacy enforcement module (PEM). The PEM may receive the operational data from the VCA via the communication module, may generate filtered data by filtering the operational data based on privacy settings and may cause the filtered data to be transmitted via the communication module. The filtered data may be transmitted to at least one data consumer. The privacy settings may be configured in the PEM by the at least one operator.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for secure vehicular data management with enhanced privacy, as provided below.

Example 1

According to this example there is provided a device comprising a communication module to communicate with at least a vehicular control architecture for controlling operation of a vehicle in which the device is situated and a trusted execution environment including a privacy enforcement module to receive operational data from the vehicular control architecture via the communication module, generate filtered data by filtering the operational data based on privacy settings and cause the filtered data to be transmitted by the communication module.

Example 2

This example includes the elements of example 1, wherein the communication module is further to communicate with at least one data consumer.

Example 3

This example includes the elements of example 2, wherein the at least one data consumer is situated outside of the vehicle.

Example 4

This example includes the elements of example 3, wherein the communication with the at least one data consumer is conducted via a wired interface physically coupled to the vehicle or via a wireless link.

Example 5

This example includes the elements of any of examples 3 to 4, wherein the at least one data consumer comprises at least one of a mechanic, an insurance company, a personal cloud service or a vehicular data accumulator.

Example 6

This example includes the elements of any of examples 2 to 5, wherein the privacy enforcement module is further to receive a request for the filtered data from the at least one data consumer via the communication module.

Example 7

This example includes the elements of any of examples 1 to 6, wherein the trusted execution environment is a secure workspace in which only known-good programs execute, the privacy enforcement module being a known-good program.

Example 8

This example includes the elements of example 7, wherein the trusted execution environment includes at least one secure enclave in the device.

Example 9

This example includes the elements of any of examples 1 to 8, wherein the privacy enforcement module being to generate filtered data comprises the privacy enforcement module being to remove at least a portion of the operational data from the filtered data based on the privacy settings.

Example 10

This example includes the elements of any of examples 1 to 9, wherein the operational data comprises data identifying at least one vehicle operator and vehicular operational data recorded during operation of the vehicle by the at least one vehicle operator.

Example 11

This example includes the elements of example 10, wherein the privacy enforcement module being to generate filtered data comprises the privacy enforcement module being to replace the data identifying the at least one vehicle operator with coded identification data or to alter the data identifying the at least one vehicle operator to render the at least one vehicle operator anonymous based on the privacy settings.

Example 12

This example includes the elements of any of examples 1 to 11, wherein the vehicular control architecture comprises a plurality of controllers for controlling different areas of vehicular operation.

Example 13

This example includes the elements of example 12, wherein the plurality of controllers communicate using a bus communication architecture.

Example 14

This example includes the elements of any of examples 12 to 13, wherein the plurality of controllers communicate using an optical mesh communication architecture.

Example 15

This example includes the elements of any of examples 12 to 14, wherein at least one controller in the plurality of controllers is to control a user interface in the vehicle for allowing the privacy settings to be configured.

Example 16

This example includes the elements of any of examples 1 to 15, wherein the device is removable from the vehicle.

Example 17

This example includes the elements of example 16, wherein the device is a mobile communication device.

Example 18

This example includes the elements of any of examples 16 to 17, wherein the device is a mobile computing device.

Example 19

This example includes the elements of any of examples 1 to 18, wherein the vehicular control architecture comprises a plurality of controllers for controlling different areas of vehicular operation, at least one controller in the plurality of controllers being to control a user interface in the vehicle for allowing the privacy settings to be configured.

Example 20

According to this example there is provided a method comprising receiving operational data in a device from a vehicular control architecture for controlling a vehicle in which the device is situated, generating filtered data by filtering the operational data based on privacy settings, the filtered data being generated by a privacy enforcement module included in a trusted execution environment in the device and causing the filtered data to be transmitted.

Example 21

This example includes the elements of example 20, wherein causing the filtered data to be transmitted comprises causing the filtered data to be transmitted to at least one data consumer.

Example 22

This example includes the elements of example 21, wherein the at least one data consumer is situated outside of the vehicle.

Example 23

This example includes the elements of example 22, wherein the communication with the at least one data consumer is conducted via a wired interface physically coupled to the vehicle or via a wireless link.

Example 24

This example includes the elements of any of examples 22 to 23, wherein the at least one data consumer comprises at least one of a mechanic, an insurance company, a personal cloud service or a vehicular data accumulator.

Example 25

This example includes the elements of any of examples 20 to 24, and further comprises receiving a request for the filtered data from the at least one data consumer.

Example 26

This example includes the elements of any of examples 20 to 25, wherein the trusted execution environment is a secure workspace in which only known-good programs execute, the privacy enforcement module being a known-good program.

Example 27

This example includes the elements of example 26, wherein the trusted execution environment includes at least one secure enclave in the device.

Example 28

This example includes the elements of any of examples 20 to 27, wherein generating filtered data comprises removing at least a portion of the operational data from the filtered data based on the privacy settings.

Example 29

This example includes the elements of any of examples 20 to 28, wherein the operational data comprises data identifying at least one vehicle operator and vehicular operational data recorded during operation of the vehicle by the at least one vehicle operator.

Example 30

This example includes the elements of example 29, wherein generating filtered data comprises replacing the data identifying the at least one vehicle operator with coded identification data or altering the data identifying the at least one vehicle operator to render the at least one vehicle operator anonymous based on the privacy settings.

Example 31

This example includes the elements of any of examples 20 to 30, further comprising providing a user interface in the vehicle for allowing the privacy settings to be configured.

Example 32

According to this example there is provided a system including at least one device, the system being arranged to perform the method of any of the above examples 20 to 31.

Example 33

According to this example there is provided a chip set arranged to perform the method of any of the above examples 20 to 31.

Example 34

According to this example there is provided at least one machine readable medium comprising a plurality of instructions that, in response to be being executed on a computing device, cause the computing device to carry out the method according to any of the above examples 20 to 31.

Example 35

According to this example there is provided at least one device configured for secure vehicular data management with enhanced privacy, the device being arranged to perform the method of any of the above examples 20 to 31.

Example 36

According to this example there is provided a device having means to perform the method of any of the above examples 20 to 31.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
communication circuitry to communicate with at least a vehicular control architecture for controlling operation of a vehicle in which the device is situated; and
a trusted execution environment including a privacy enforcement circuitry to:
receive operational data from the vehicular control architecture via the communication circuitry;
generate filtered data by filtering the operational data based on privacy settings;
cause the filtered data to be transmitted by the communication circuitry;
wherein the vehicular control architecture comprises a plurality of controllers for controlling different areas of vehicular operation and wherein at least one controller in the plurality of controllers is to control a user interface in the vehicle for allowing the privacy settings to be configured; and
wherein the privacy enforcement circuitry is further to replace the data identifying the at least one vehicle operator with coded identification data or to alter the data identifying the at least one vehicle operator to render the at least one vehicle operator anonymous based on the privacy settings.

2. The device of claim 1, wherein the communication circuitry is further to communicate with at least one data consumer.

3. The device of claim 2, wherein the privacy enforcement circuitry is further to receive a request for the filtered data from the at least one data consumer via the communication circuitry.

4. The device of claim 1, wherein the trusted execution environment is a secure workspace in which only known-good programs execute, the privacy enforcement circuitry being a known-good program executed in the secure workspace.

5. The device of claim 1, wherein the privacy enforcement circuitry is further to remove at least a portion of the operational data from the filtered data based on the privacy settings.

6. The device of claim 1, wherein the operational data comprises data identifying at least one vehicle operator and vehicular operational data recorded during operation of the vehicle by the at least one vehicle operator.

7. A method, comprising:
receiving operational data in a device from a vehicular control architecture for controlling a vehicle in which the device is situated;
generating filtered data by filtering the operational data based on privacy settings, the filtered data being generated by privacy enforcement circuitry included in a trusted execution environment in the device;
causing the filtered data to be transmitted;
wherein the operational data comprises data identifying at least one vehicle operator and vehicular operational data recorded during operation of the vehicle by the at least one vehicle operator; and
wherein generating filtered data comprises replacing the data identifying the at least one vehicle operator with coded identification data or altering the data identifying the at least one vehicle operator to render the at least one vehicle operator anonymous based on the privacy settings.

8. The method of claim 7, wherein causing the filtered data to be transmitted comprises causing the filtered data to be transmitted to at least one data consumer.

9. The method of claim 8, further comprising:
receiving a request for the filtered data from the at least one data consumer.

10. The method of claim 7, wherein the trusted execution environment is a secure workspace in which only known-good programs execute, the privacy enforcement circuitry being a known-good program executed in the secure workspace.

11. The method of claim 7, wherein generating filtered data comprises removing at least a portion of the operational data from the filtered data based on the privacy settings.

12. The method of claim 7, further comprising:
providing a user interface in the vehicle for allowing the privacy settings to be configured.

13. At least one machine-readable storage medium having stored thereon, individually or in combination, instructions that when executed by one or more processors result in the following operations comprising:
receiving operational data in a device from a vehicular control architecture for controlling a vehicle in which the device is situated;
generating filtered data by filtering the operational data based on privacy settings, the filtered data being generated by a privacy enforcement circuitry included in a trusted execution environment in the device;
causing the filtered data to be transmitted;
wherein the operational data comprises data identifying at least one vehicle operator and vehicular operational data recorded during operation of the vehicle by the at least one vehicle operator; and
wherein generating filtered data comprises replacing the data identifying the at least one vehicle operator with coded identification data or altering the data identifying the at least one vehicle operator to render the at least one vehicle operator anonymous based on the privacy settings.

14. The medium of claim 13, wherein causing the filtered data to be transmitted comprises causing the filtered data to be transmitted to at least one data consumer.

15. The medium of claim 14, further comprising instructions that when executed by one or more processors result in the following operations comprising:
receiving a request for the filtered data from the at least one data consumer.

16. The medium of claim 13, wherein the trusted execution environment is a secure workspace in which only known-good programs execute, the privacy enforcement circuitry being a known-good program executed in the secure workspace.

17. The medium of claim 13, wherein generating filtered data comprises removing at least a portion of the operational data from the filtered data based on the privacy settings.

18. The medium of claim 13, further comprising instructions that when executed by one or more processors result in the following operations comprising:
providing a user interface in the vehicle for allowing the privacy settings to be configured.

* * * * *